US008967090B2

(12) United States Patent
Inoue et al.

(10) Patent No.: US 8,967,090 B2
(45) Date of Patent: Mar. 3, 2015

(54) SADDLE-RIDE TYPE VEHICLE

(71) Applicant: Honda Motor Co., Ltd., Tokyo (JP)

(72) Inventors: Yusuke Inoue, Wako (JP); Munehiro Toda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/670,759

(22) Filed: Nov. 7, 2012

(65) Prior Publication Data

US 2013/0118721 A1    May 16, 2013

(30) Foreign Application Priority Data

Nov. 16, 2011    (JP) .................................. 2011-250935

(51) Int. Cl.
| F01P 7/00 | (2006.01) |
| F28D 1/053 | (2006.01) |
| F01P 3/18 | (2006.01) |
| B60K 11/04 | (2006.01) |
| F28D 21/00 | (2006.01) |

(52) U.S. Cl.
CPC ............... *F28D 1/05366* (2013.01); *F01P 3/18* (2013.01); *B60K 11/04* (2013.01); *F28D 2021/0092* (2013.01); *F28D 2021/0094* (2013.01); *B60Y 2200/132* (2013.01); *F01P 2050/16* (2013.01)
USPC .................... 123/41.01; 123/195 R; 123/41.1

(58) Field of Classification Search
CPC ........... B60K 11/04; B60K 11/02; F01P 3/18; F28D 1/00; F28D 2021/0092; F28D 1/0435; F28D 1/0443; F28D 1/05366; F28D 1/06; F28D 2021/0094; B62K 11/10; F28F 9/0246

USPC ....... 123/41.01, 41.1, 195 R, 195 A; 165/148
See application file for complete search history.

(56) References Cited

U.S. PATENT DOCUMENTS

| 5,176,111 | A * | 1/1993 | Nakamura et al. | 123/41.01 |
| 6,332,505 | B1 * | 12/2001 | Tateshima et al. | 180/229 |
| 6,345,508 | B1 * | 2/2002 | Bodhaine et al. | 62/50.3 |
| 7,404,463 | B2 * | 7/2008 | Saiki et al. | 180/68.4 |
| 2011/0023840 | A1 * | 2/2011 | Cattani et al. | 123/568.12 |

FOREIGN PATENT DOCUMENTS

| JP | 2006062409 A * | 3/2006 |
| JP | 4145426 B2 | 6/2008 |

* cited by examiner

*Primary Examiner* — Noah Kamen
*Assistant Examiner* — Long T Tran
(74) *Attorney, Agent, or Firm* — Birch, Stewart, Kolasch & Birch, LLP

(57) ABSTRACT

A saddle-ride vehicle includes a radiator body having a first radiator and a second radiator each including a core composed of radiating fins and tubes, alternately laminated. The radiator body is disposed forward of an engine while sandwiching a down tube between the first and second radiators in a vehicle left-right direction with the down tube extending rearwardly and downwardly of a head pipe. The radiator bodies and an exhaust pipe connected to the engine are disposed in an overlapping manner when the vehicle is viewed in a plan view. The lower tank of the first radiator include an inlet for the coolant from a lower communicating radiator hose that allows coolant to flow from the lower tank of the second radiator and an outlet for the coolant to a lower end radiator hose that is connected from the lower tank of the first radiator to the engine.

22 Claims, 10 Drawing Sheets

SADDLE-RIDE TYPE VEHICLE

CROSS-REFERENCE TO RELATED APPLICATIONS

The present application claims priority under 35 USC 119 to Japanese Patent Application No. 2011-250935 filed Nov. 16, 2011 the entire contents of which are hereby incorporated by reference.

BACKGROUND OF THE INVENTION

1. Field of the Invention

The present invention relates to a saddle-ride type vehicle. More particularly, to a saddle-ride type vehicle with an improved radiator and exhaust pipe.

2. Description of Background Art

In a known radiator for a saddle-ride type vehicle, a radiator body is composed of a core with radiating fins and coolant tubes alternately laminated, an upper tank for supplying coolant to the core, and a lower tank for collecting the coolant. The radiator body, with tubes disposed at upper and lower portions thereof, is disposed forward of and above an engine and fixed to a body frame. See, for example, JP Patent No. 4145426.

In the foregoing radiator supporting structure, the radiator and the exhaust pipe of the engine are disposed in an overlapping manner in a plan view. Furthermore, in vehicles mounted with a two-stroke engine, the exhaust pipe carries a large expansion chamber partway along its length. Therefore, there is disclosed a structure in which the lower tank of the radiator is provided with a recess so as to avoid interference with the expansion chamber.

In vehicles mounted with a four-stroke engine, an upstream inlet of the exhaust pipe (an inlet connected to an exhaust port) is located upwardly above the engine as compared to that in vehicles with a two-stroke engine. For this reason, there is a need for the design being such that the interference between the upstream inlet and the lower tank of the radiator is prevented.

However, if the capacity of the radiator is increased to enhance the cooling capability without interference between the radiator and the exhaust pipe of the engine, it causes the problems of limited space through which the exhaust pipe is routed and difficulties in improving the engine output. On the other hand, if the space for routing is increased by increasing the curvature of the exhaust pipe, there is a problem in that the capacity of the radiator is limited and the cooling capability is less likely to be fully used.

SUMMARY AND OBJECTS OF THE INVENTION

Accordingly, an embodiment of the present invention is to provide a saddle-ride type vehicle in which the capacity of a radiator can be sufficiently ensured and exhaust pipe routing space can be also sufficiently ensured.

According to an embodiment of the present invention, a saddle-ride type vehicle has a radiator body including a first radiator and a second radiator. The first and second radiators each have a core composed of radiating fins and tubes alternately laminated with the tubes allowing passage of coolant. An upper tank and a lower tank are connected to each end in a longitudinal direction of the tubes to allow storage of the coolant.

The radiator body is disposed forward of an engine while sandwiching a down tube between the first and second radiators in a vehicle left-right direction. The down tube extends rearwardly and downwardly of a head pipe. The radiator body, and an exhaust pipe connected to the engine, are disposed in an overlapping manner when the vehicle is viewed in a plan view.

The lower tank of the first radiator includes an inlet for the coolant from a lower communicating radiator hose that allows coolant to flow from the lower tank of the second radiator. An outlet for the coolant to a lower end radiator hose is connected from the lower tank of the first radiator to the engine.

The exhaust pipe has an exhaust pipe coupling portion connected to the engine, the exhaust pipe coupling portion being provided so as to be deviated to the second radiator.

According to an embodiment of the present invention, the second radiator has a radiator lower end raised above that of the first radiator.

According to an embodiment of the present invention, the lower communicating radiator hose is provided so as to pass under the exhaust pipe extending forward of the vehicle from the exhaust pipe coupling portion and is expanded downwardly.

According to an embodiment of the present invention, the inlet and the outlet are provided in positions overlapping each other in a vehicle width direction when viewed in a vehicle front-rear direction.

According to an embodiment of the present invention, the lower tank is provided with a lower recess at a portion of a lower surface thereof. The portion of the lower surface is displaced from a multiple-pipe connection that is formed with the inlet and the outlet. The lower recess avoids interference with the exhaust pipe. The exhaust pipe is disposed to pass through space formed by the lower recess.

According to an embodiment of the present invention, the first radiator is constructed to have a larger capacity than the second radiator. The coolant from the engine is injected into the upper tank of the first radiator. The saddle-ride type vehicle is provided with an upper communicating radiator hose for supplying the coolant from the upper tank of the first radiator to the upper tank of the second radiator.

According to an embodiment of the present invention, the exhaust pipe coupling portion, serving as a connection of the exhaust pipe to the engine, is provided so as to be deviated to the second radiator with respect to a vehicle body center line. On the first radiator opposite the side of the second radiator, the inlet for the coolant from the lower communicating radiator hose that connects the lower tanks of the left and right radiators to each other and the outlet for the coolant to the lower end radiator hose connected to the engine are provided. With this structure, the exhaust pipe and the piping structure of the radiator body can be dispersed between the left and right of the vehicle and the limited space of a small vehicle can be effectively used.

It is therefore possible to widely route the exhaust pipe while ensuring the capacity of the radiator body, and contribute to an improvement in engine output.

According to an embodiment of the present invention, the radiator lower end of the second radiator located forward of the exhaust pipe of the engine is disposed on the vehicle upper side than that of the first radiator, thereby allowing an increased piping space for the exhaust pipe extending from the exhaust pipe coupling portion. It is therefore possible to install the exhaust pipe with a large curvature and improve the engine output.

According to an embodiment of the present invention, the lower communicating radiator hose is installed to pass under the exhaust pipe. Thus, the layout space for the exhaust pipe coupling portion can be easily obtained. Furthermore, the lower communicating radiator hose has the downwardly expanding piping form. Thus, air becomes less likely to accumulate in the lower communicating radiator hose and the flow of coolant can be made smoother.

According to an embodiment of the present invention, the inlet and outlet for coolant provided in the lower tank of the first radiator are disposed in an overlapping manner in the vehicle width direction. Thus, the inlet and the outlet are located close to each other, and therefore it is possible to make the coolant flowing in through the inlet more likely to flow to the outlet, thereby avoiding the stagnation of coolant on the second radiator and allowing a favorable flow of coolant.

According to an embodiment of the present invention, the inlet connected to the lower communicating radiator hose and the outlet connected to the lower end radiator hose are formed in the portion of the lower tank which has a larger capacity. Thus, the coolant flow of one radiator becomes less likely to affect the coolant flow of the other radiator, and the flow of coolant is improved. Additionally, the lower recess is provided in the lower surface of the lower tank which is displaced from the portions having the inlet and the outlet. Thus, the exhaust pipe routing space can be favorably formed.

According to an embodiment of the present invention, the two upper tanks disposed on both sides are connected to each other through the upper communicating radiator hose. This eliminates the need for the piping construction having a trifurcated joint for the distribution of the coolant from the engine between the two upper tanks. Also, this allows not only a reduction in the number of components and a compact piping structure but also increases the assembly performance and productivity. In addition, the construction is such that coolant flows from the radiator having a large capacity to the radiator having a small capacity, thereby allowing an improvement in the flow of coolant.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
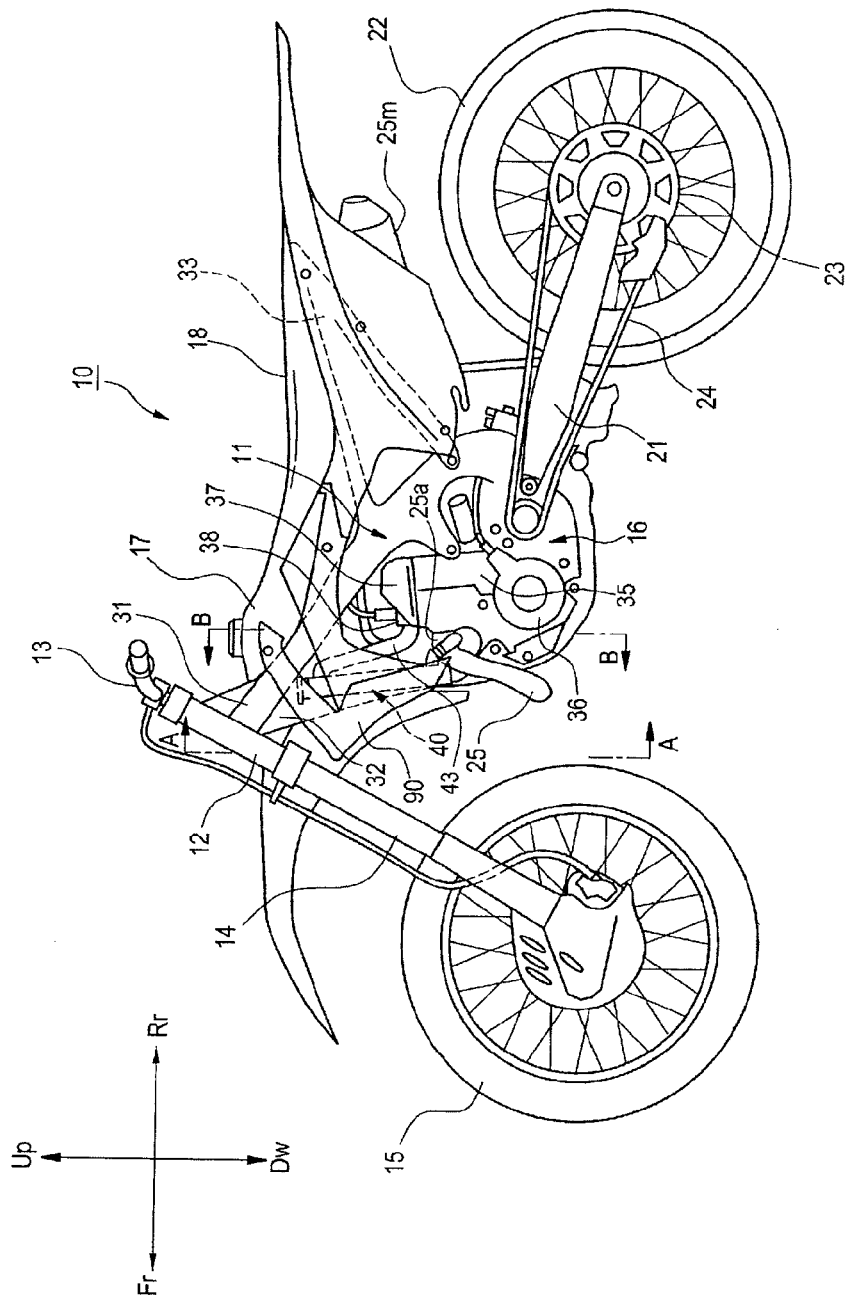
FIG. 1 is a left side view of a motorcycle according to an embodiment of the present invention.

Hereinafter, an embodiment of the present invention will be described. A first embodiment of the present invention will be described in detail with reference to FIGS. 1 to 9.

A motorcycle serving as a saddle-ride type vehicle of this embodiment will be explained wherein the drawings should be viewed in the direction of the reference numerals. In addition, references to directions in the following description are made with reference to a rider. In the drawings, "Fr" denotes a front direction, "Rr" a rear direction, "L" a left direction, "R" a right direction, "Up" an upward direction, and "Dw" a downward direction. It is also to be noted that, in the following description and the drawings, the last letter of the reference signs, "L" or "R", represents the left or right hand, respectively.

FIG. 1 is a left side view of a motorcycle 10 according to the present invention. The motorcycle 10 has a body frame 11 with a handlebar 13 and a front fork 14 steerably attached to a head pipe 12 on a front end of the body frame 11 and a front wheel 15 attached to the front fork 14. An engine 16 is disposed at a central lower portion of the body frame 11 with a fuel tank 17 and a seat 18 disposed at an upper portion of the body frame 11. A swing arm 21 extends in a vertically movable manner from a central lower portion of the body frame 11 with a rear wheel 22 attached to a rear portion of the swing arm 21. A rear sprocket 23 is attached to the rear wheel 22 with a chain 24 being provided for transmitting a driving force to the rear sprocket 23.

The body frame 11 is composed of the head pipe 12, a pair of left and right main frames 31 extending rearwardly from the head pipe 12, a single down tube 32 hanging down from the head pipe 12 and extending rearward, a pair of left and right seat rails 33 extending rearwardly from rear portions of the main frames 31, and the like.

The engine 16 is a four-cycle water-cooled engine that includes a cylinder block 35, a crankcase 36 attached below the cylinder block 35, a cylinder head 37 attached above the cylinder block 35, a thermostat cap 38 attached to the cylinder head 37 and a water pump 39 (see FIG. 2) provided at, for example, a right lower portion of the crankcase 36.

Figure 9:
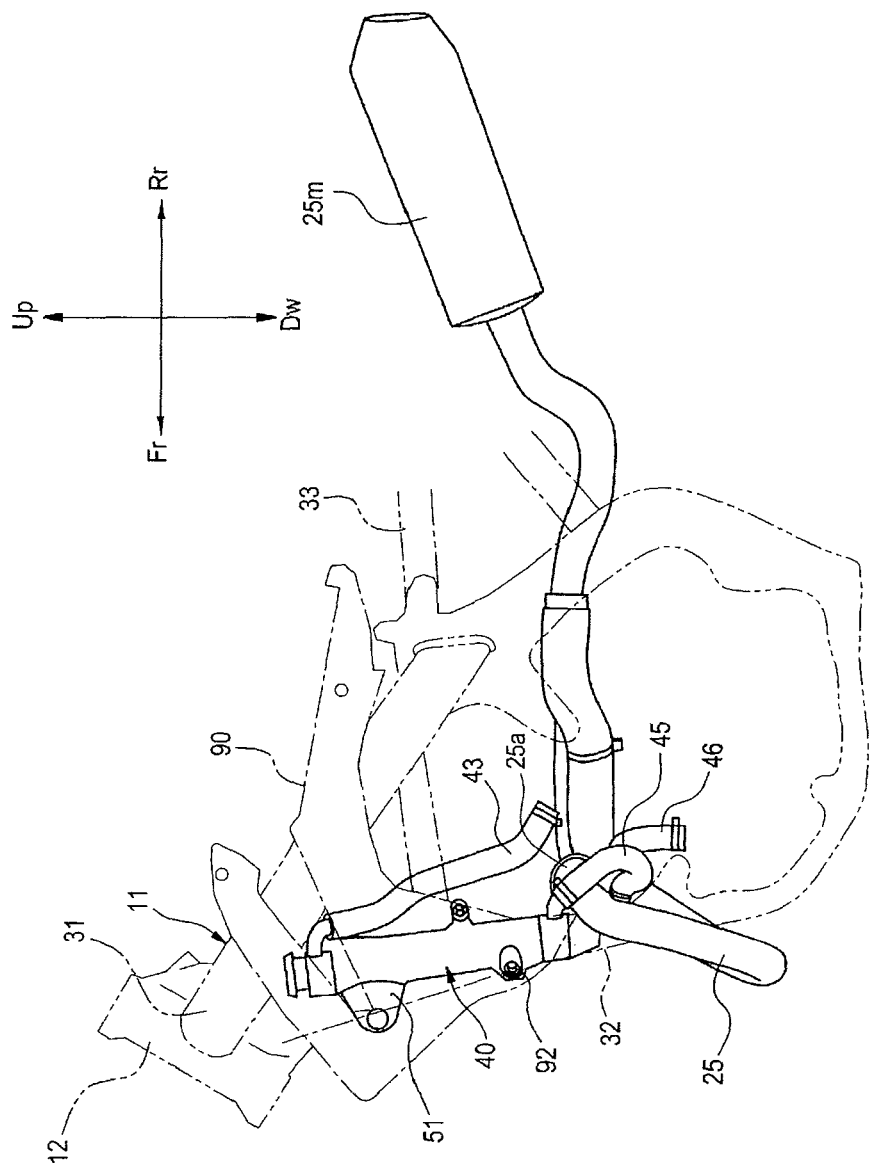
FIG. 9 is a schematic side view of the essential parts for illustrating the layout of the radiator body, a body frame, and an exhaust pipe according to the present invention.

Furthermore, a radiator body 40 is a heat exchanger that is disposed forward of the cylinder head 37 of the engine 16 to cool the engine 16. As shown in FIG. 9, the radiator body 40 is fixed along the down tube 32.

Figure 2:
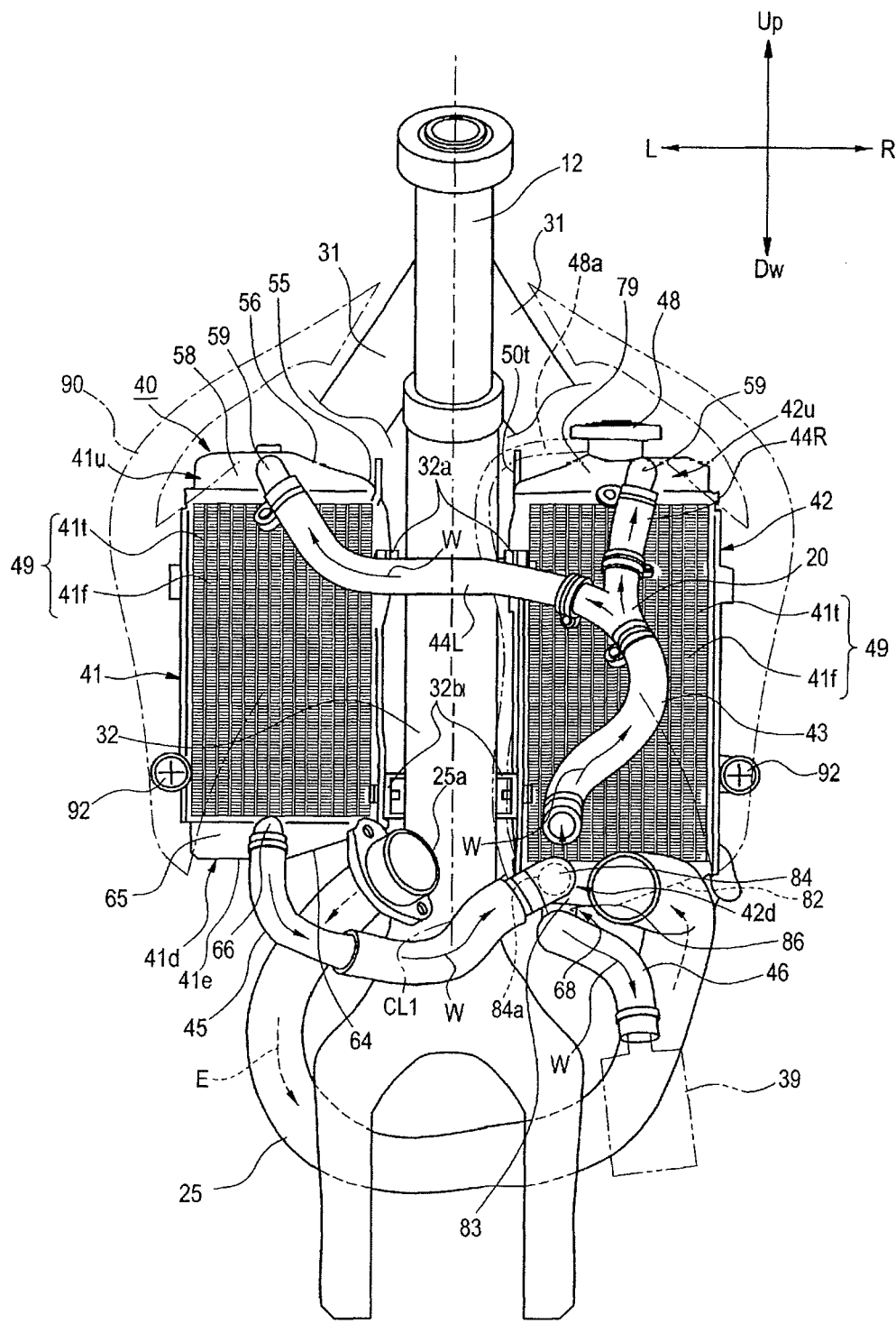
FIG. 2 is a sectional view taken along arrowed line B-B of FIG. 1.
Figure 3:
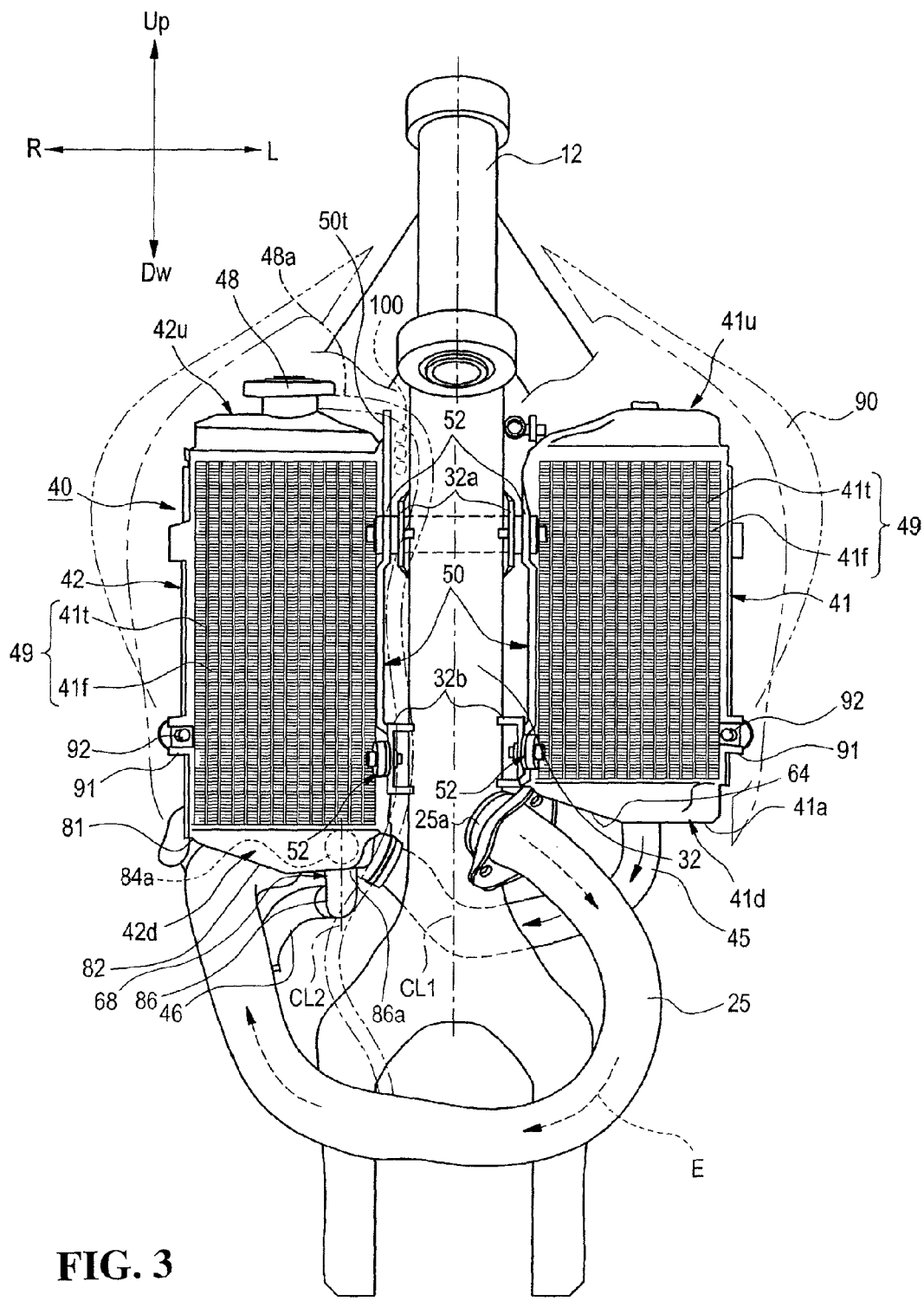
FIG. 3 is a sectional view taken along arrowed line A-A of FIG. 1.

The radiator body 40 of this embodiment will be described in detail with reference to FIGS. 2 to 5. It is to be noted that FIG. 2 is a sectional view taken along the arrowed line B-B of FIG. 1, showing the radiator body 40 viewed from the rear of the vehicle and FIG. 3 is a sectional view taken along the arrowed line A-A of FIG. 1, showing the radiator body 40 viewed from the front of the vehicle. In both drawings, the engine 16 and engine surrounding structures are not shown, as appropriate. In addition, FIG. 4 is a perspective view of the radiator body 40 in an installed position on a vehicle body, viewed from the diagonally forward left of the vehicle body.

Figure 4:
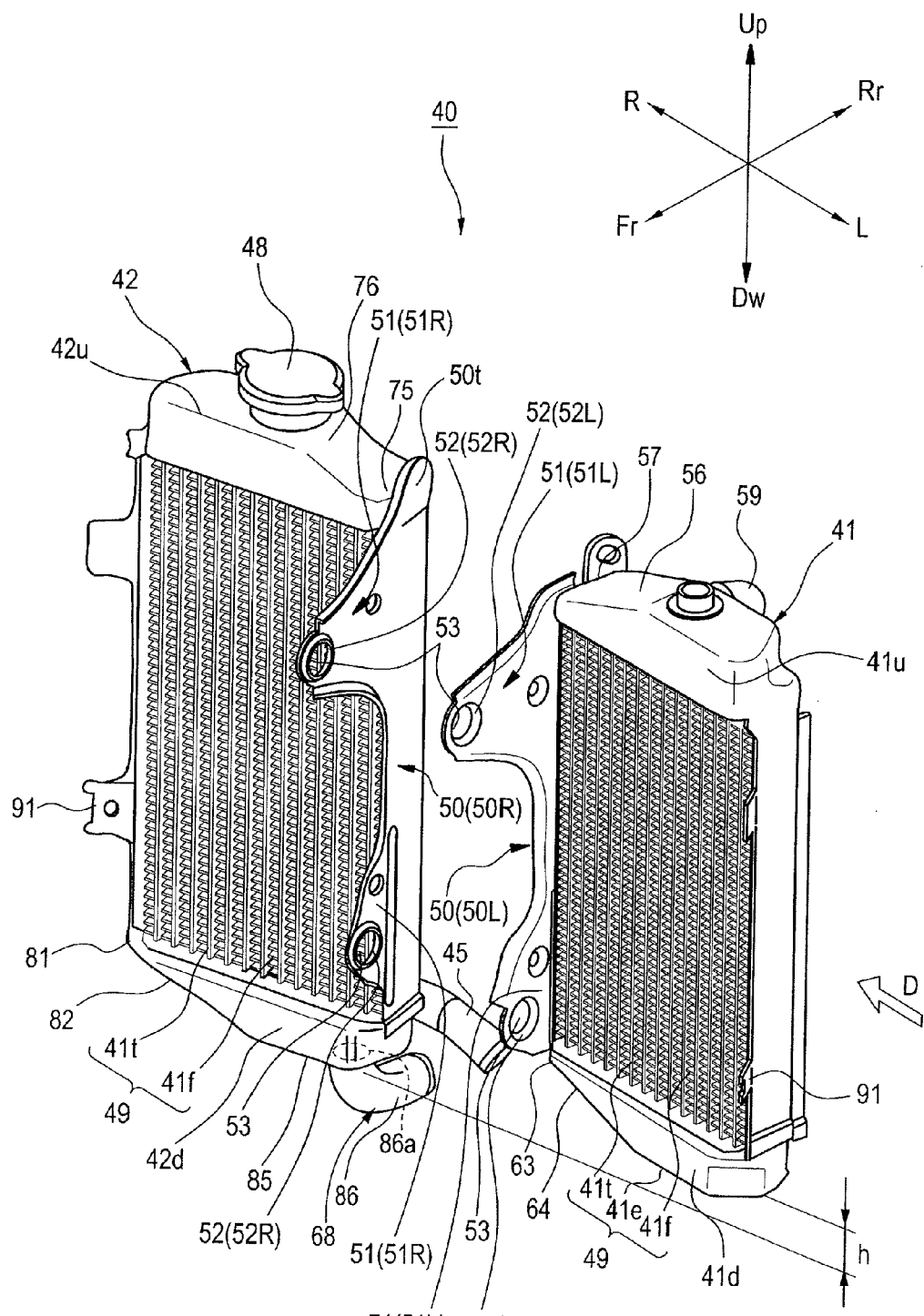
FIG. 4 is a perspective view of a radiator body in an installed position on a vehicle body, viewed from the diagonally forward left of the vehicle body.
Figure 5:
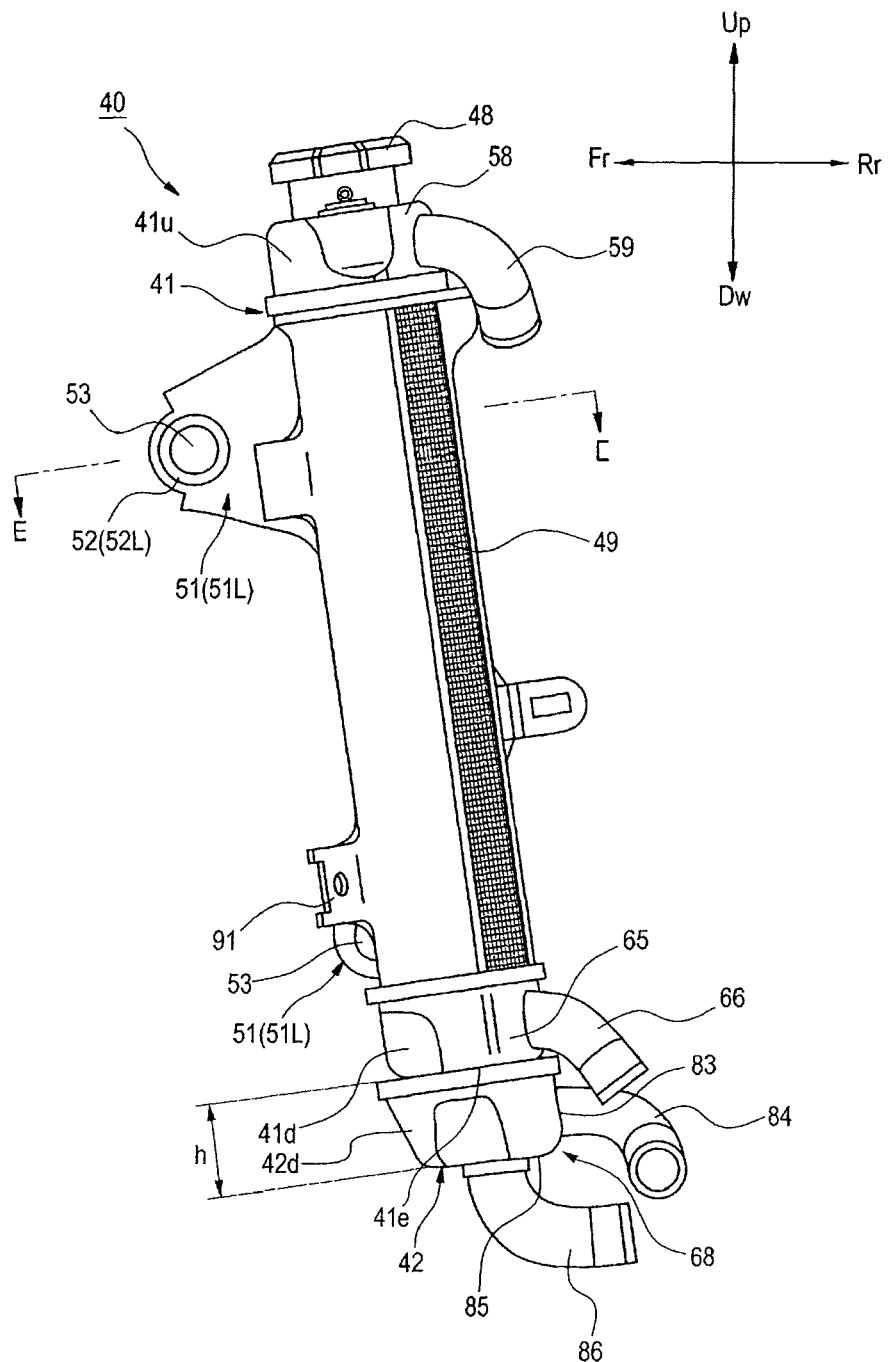
FIG. 5 is a side view taken in a direction of arrow D of FIG. 4.

FIG. 5 is a side view taken in a direction of the left side in FIG. 4 (taken in the direction of arrow D).

The radiator body 40 of this embodiment is, as shown in FIG. 2, a pair of left and right heat exchangers including a right radiator 42 serving as a first radiator disposed on the right of the down tube 32 extending downwardly of the vehicle body along a vehicle body center line CL1, and a left radiator 41 serving as a second radiator disposed on the left of the down tube 32. The left and right radiators 41 and 42 of the radiator body 40, as shown in FIGS. 2 and 3, have brackets 50 (50L, 50R) fixed to four mounting portions 32a and 32b of the down tube 32. Also, as shown in FIG. 5, the radiator body 40, on the upper side thereof, is slightly inclined forwardly of the vehicle when viewed from the side of the vehicle. Further, when viewed from above the vehicle, the left and right radiators 41 and 42 are fixed with the outer side thereof slightly inclined forwardly of the vehicle (see FIG. 6).

In this manner, the radiator body 40 of this embodiment is disposed and fixed at a position such that the down tube 32 is sandwiched in between in a vehicle width direction. Therefore, the left and right radiators 41 and 42 are arranged in such a manner so as to be separated into left and right with respect to the vehicle widthwise center. Thus, the left-right weight balance of the vehicle can be favorably maintained, and the radiator body 40 is disposed while making efficient use of the vehicle body space. Also, the left and right radiators 41 and 42, which are vertically elongated, are securely held by the down tube 32 that has a high stiffness.

A piping structure of the radiator body 40, that permits the circulation of coolant W, will be described.

A first radiator hose 43 (see FIGS. 1 and 2) is connected to a coolant outlet (not shown) of the thermostat cap 38 (see FIG. 1). The high-temperature coolant W is supplied to the left and right radiators 41 and 42 through two second radiator hoses 44 (44L, 44R) formed by splitting the first radiator hose 43. Furthermore, the radiator body 40 is provided with a lower communicating radiator hose 45 that allows low-temperature coolant to circulate from a lower tank 41d of the left radiator 41 to a lower tank 42d of the right radiator 42; a lower end radiator hose 46 that allows the low-temperature coolant W to circulate from the lower tank 42d of the right radiator 42 to the water pump 39; and a siphon tube 48a in the vicinity of a radiator cap 48 that is provided in an upper portion of the right radiator 42.

Moreover, in this embodiment, the lower tank 42d of the right radiator 42 is formed with a multiple-pipe connection 68. The multiple-pipe connection 68 is formed with an inlet 84a for the coolant W from the lower communicating radiator hose 45 that allows the coolant W to flow from the lower tank 41d of the left radiator 41 and an outlet 86a for the coolant W to the lower end radiator hose 46 with the inlet 84a and the outlet 86a being arranged close to each other. The multiple-pipe connection 68 is provided on the right radiator 42 as described above, and therefore disposed toward the right of the vehicle with respect to the vehicle body center line CL1.

On the other hand, the exhaust pipe 25 is installed below the radiator body 40 as shown in FIGS. 2 and 3, and has an exhaust pipe coupling portion 25a connected to an exhaust port (not shown) of the engine 16. The exhaust pipe 25 is a pipe for sending exhaust gas E to the rear of the vehicle. In other words, the exhaust pipe 25 extends leftward and forward of the engine 16 from the exhaust pipe coupling portion 25a and also extends downwardly below the left radiator 41 and over the lower communicating radiator hose 45. Further, the exhaust pipe 25 is greatly bent to the right from below the down tube 32 and after passing under the right radiator 42, extends rearwardly of the vehicle body to extend to a muffler 25m (see FIG. 9). In this manner, the radiator body 40 and the exhaust pipe 25 are disposed in an overlapping manner when the vehicle is viewed in a plan view.

In addition, the exhaust pipe coupling portion 25a of the exhaust pipe 25 is provided so as to be deviated to the left radiator 41. In other words, the exhaust pipe coupling portion 25a is disposed toward the left of the vehicle with respect to the vehicle body center line CL1.

According to this embodiment, the exhaust pipe coupling portion 25a, serving as a connection of the exhaust pipe 25 to the engine 16, is provided so as to be deviated to the left radiator 41 (to the left) with respect to the vehicle body center line CL1, while the multiple-pipe connection 68 is provided on the right radiator 42 (on the right) opposite the side of the left radiator 41. The multiple-pipe connection 68 is provided with the inlet 84a for the coolant W from the lower communicating radiator hose 45 that connects the lower tanks 41d, 42d of the left and right radiators 41, 42 to each other, and the outlet 86a for the coolant W to the lower end radiator hose 46 connected to the engine 16. Thus, the exhaust pipe 25 and the piping structure of the radiator body 40 can be dispersed between the left and right of the vehicle and the limited space of a small vehicle can be effectively used.

It is therefore possible to widely route the exhaust pipe while ensuring the capacity of the radiator body while contributing to an improvement in the engine output.

The structures of the left and right radiators 41 and 42 will be described in more detail.

Referring to FIG. 4, the left radiator 41 has a vertically elongated shape and is composed of an upper tank 41u provided at an upper portion thereof, a core 49 provided at a central portion, the lower tank 41d provided at a lower portion, and the bracket 50 (50L). Furthermore, the upper tank 41u is provided with an upper recess 56 in an upper corner 57 toward the center of the vehicle body and has an inlet pipe joint 59 attached to a rear surface 58 (see FIGS. 2 and 5), to guide the coolant W to the core 49.

Figure 6:
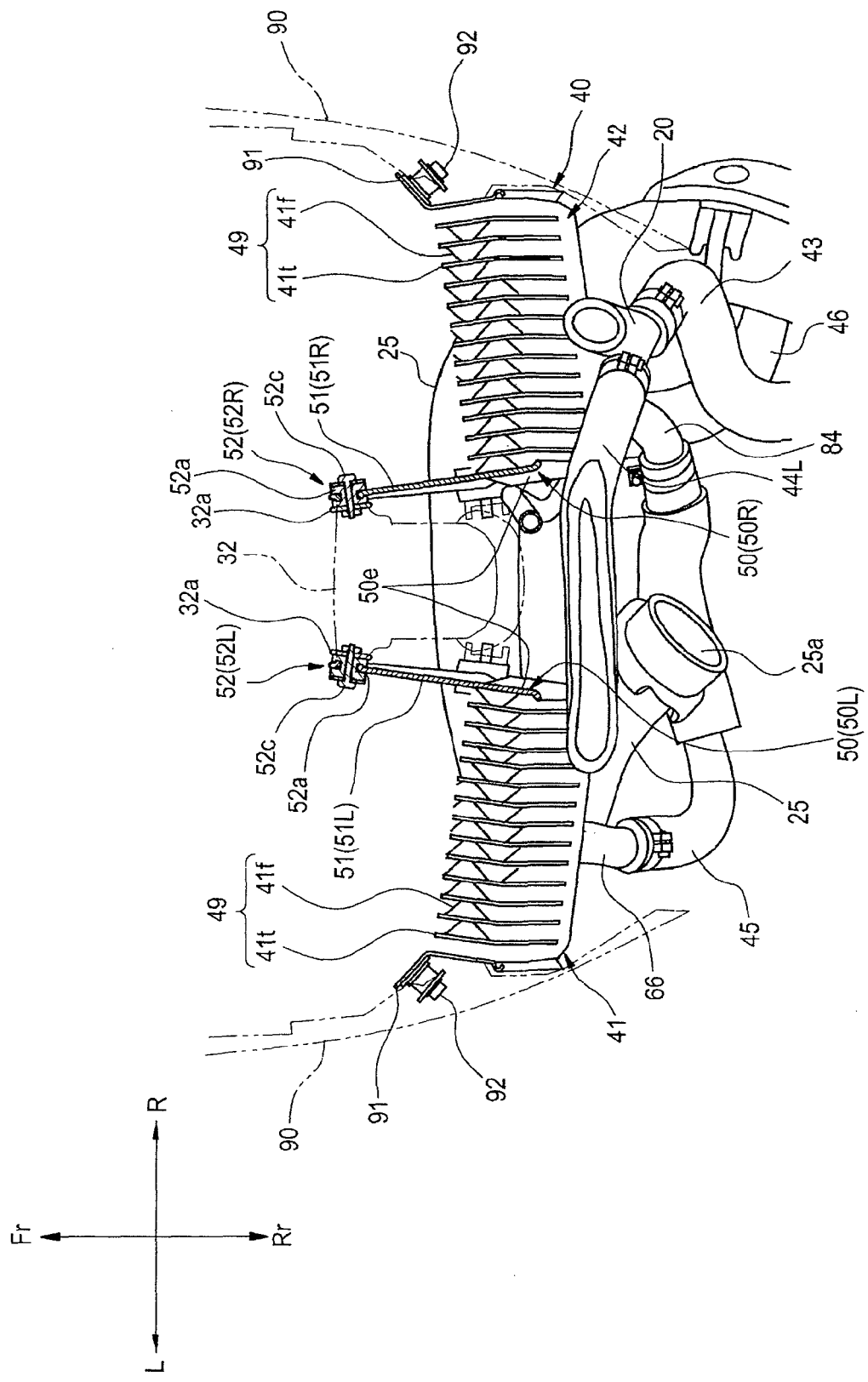
FIG. 6 is a sectional view taken along arrowed line E-E of FIG. 5.

As shown in section in FIG. 6, the core 49 is composed of a plurality of plate tubes 41t allowing passage of the coolant W, and a plurality of fins 41f of corrugated shape in cross-section provided in contact with the tubes 41t. Also, the tubes 41t communicate with the upper tank 41u and the lower tank 41d, thereby allowing the effective cooling of the coolant W passing through the tubes 41t. Furthermore, the lower tank 41d disposed at the lower portion of the core 49 has a construction in which a lower recess 64 is provided in an outer lower corner 63 (see FIG. 4) and an outlet pipe joint 66 is attached to a rear surface 65 (see FIGS. 2 and 5), to guide the coolant W to the lower tank 42d of the right radiator 42. Also, as shown in FIGS. 4 and 5, the left radiator 41 is disposed such that a radiator lower end 41e is raised, as appropriate, to a height h above that of the right radiator 42.

It is to be noted that, although not shown in the drawings, the front surfaces of the left and right cores 49 are each provided with a louver structure that guides airflow to the cores 49 while the vehicle travels.

In this manner, the radiator lower end 41e of the left radiator 41 located forward of the exhaust pipe 25 of the engine 16 is raised, thereby allowing an increased piping space for the exhaust pipe 25 extending from the exhaust pipe coupling portion 25a. It is therefore possible to install the exhaust pipe 25 with a large curvature and improve the engine output. Also, in this embodiment, the lower recess 64 is provided, thereby forming a further increased piping space.

On the other hand, the right radiator 42 has a vertically elongated shape and is composed of an upper tank 42u provided at an upper portion thereof, the core 49 provided at a central portion, the lower tank 42d provided at a lower portion, and the bracket 50R. The right radiator 42 is slightly increased in length relative to the left radiator 41. Furthermore, the upper tank 42u is provided with an upper recess 76 in an upper corner 75 toward the center of the vehicle body and has the inlet pipe joint 59 attached to a rear surface 79 (see FIG. 2), thereby enabling the guiding of the coolant W to the core 49.

In the same manner as the core 49 of the foregoing left radiator 41, as shown in FIG. 6, the core 49 is composed of the plurality of tubes 41t allowing passage of the coolant W. In addition, the plurality of fins 41f of corrugated shape in cross-section is provided between the tubes 41t.

Furthermore, the lower tank 42d is provided with a lower recess 82 in an outer lower corner 81 and constructed to increase the space through which the exhaust pipe 25 is routed. Also, the lower tank 42d has a lower pipe joint 84 attached to a rear surface 83 (see FIGS. 2 and 5), and is formed with the inlet 84a (see FIGS. 2 and 3) for the coolant W from the lower communicating radiator hose 45 that allows coolant to flow from the lower tank 41d. In addition, the lower tank 42d also has an outlet pipe joint 86 attached to a lower surface 85 (see FIG. 5), and is formed with the outlet 86a (see FIG. 4) for the coolant W to the lower end radiator hose 46 that is connected from the lower tank 42d of the right radiator 42 to the engine 16. The lower tank 42d is constructed to guide the coolant W to the engine 16.

Moreover, in this embodiment, the lower communicating radiator hose 45 is provided in a downwardly expanding manner so that the lower communicating radiator hose 45 passes under the exhaust pipe 25 extending forward of the vehicle from the exhaust pipe coupling portion 25a. In this manner, the lower communicating radiator hose 45 is installed to pass under the exhaust pipe 25, thereby easily obtaining the layout space for the exhaust pipe coupling portion 25a. Furthermore, the lower communicating radiator hose 45 has the downwardly expanding form, thereby preventing an angled piping condition, that is, the piping condition in which a portion or the whole of the piping is raised relative to other portions. Consequently, air becomes less likely to accumulate in the lower communicating radiator hose 45 and the flow of coolant becomes smoother.

Further, in the lower tank 42d of the right radiator 42, as described above, the lower recess 82 for avoiding interference with the exhaust pipe 25 is provided at a portion of the lower surface 85 that is displaced from the multiple-pipe connection 68 that is formed with the inlet 84a connected to the lower communicating radiator hose 45 and the outlet 86a connected to the lower end radiator hose 46. Thus, it is possible to form a larger space for routing the exhaust pipe 25 while favorably keeping the flow of the coolant W.

Next, the coolant route will be described.

When the coolant W reaches a predetermined temperature, a thermostat within the thermostat cap 38 is opened and the coolant W flows into the upper tank 41u of the left radiator 41 and the upper tank 42u of the right radiator 42 from the coolant outlet through the first radiator hose 43, a branch pipe 20, and the second radiator hoses 44L and 44R, and then flows downwardly from the left and right cores 49 into the lower tank 41d and the lower tank 42d. Here, the coolant W in the lower tank 41d flows through the lower communicating radiator hose 45 into the lower tank 42d located on the right of the vehicle. The coolant W in the lower tank 42d flows through the lower end radiator hose 46 into the water pump 39. Then the cooled coolant W is supplied again to the engine 16 and circulates.

Also, in this embodiment, as shown in FIG. 3, the inlet 84a of the multiple-pipe connection 68 connected to the lower communicating radiator hose 45 and the outlet 86a of the multiple-pipe connection 68 connected to the lower end radiator hose 46 are provided in positions overlapping each other in the vehicle width direction when viewed in a vehicle front-rear direction. As described above, the inlet 84a and outlet 86a for the coolant W, which are formed in the lower tank 42d of the right radiator 42, are provided so as to be closely aligned in positions overlapping each other in the vehicle width direction (on the vertical line CL2 in FIG. 3). Thus, the coolant W flowing in from the left radiator 41 on the other side thereof can be immediately discharged without stagnating in the lower tank 42d of the right radiator 42, thereby allowing the smooth flow of the coolant W while avoiding stagnation of the coolant W.

Figure 7:
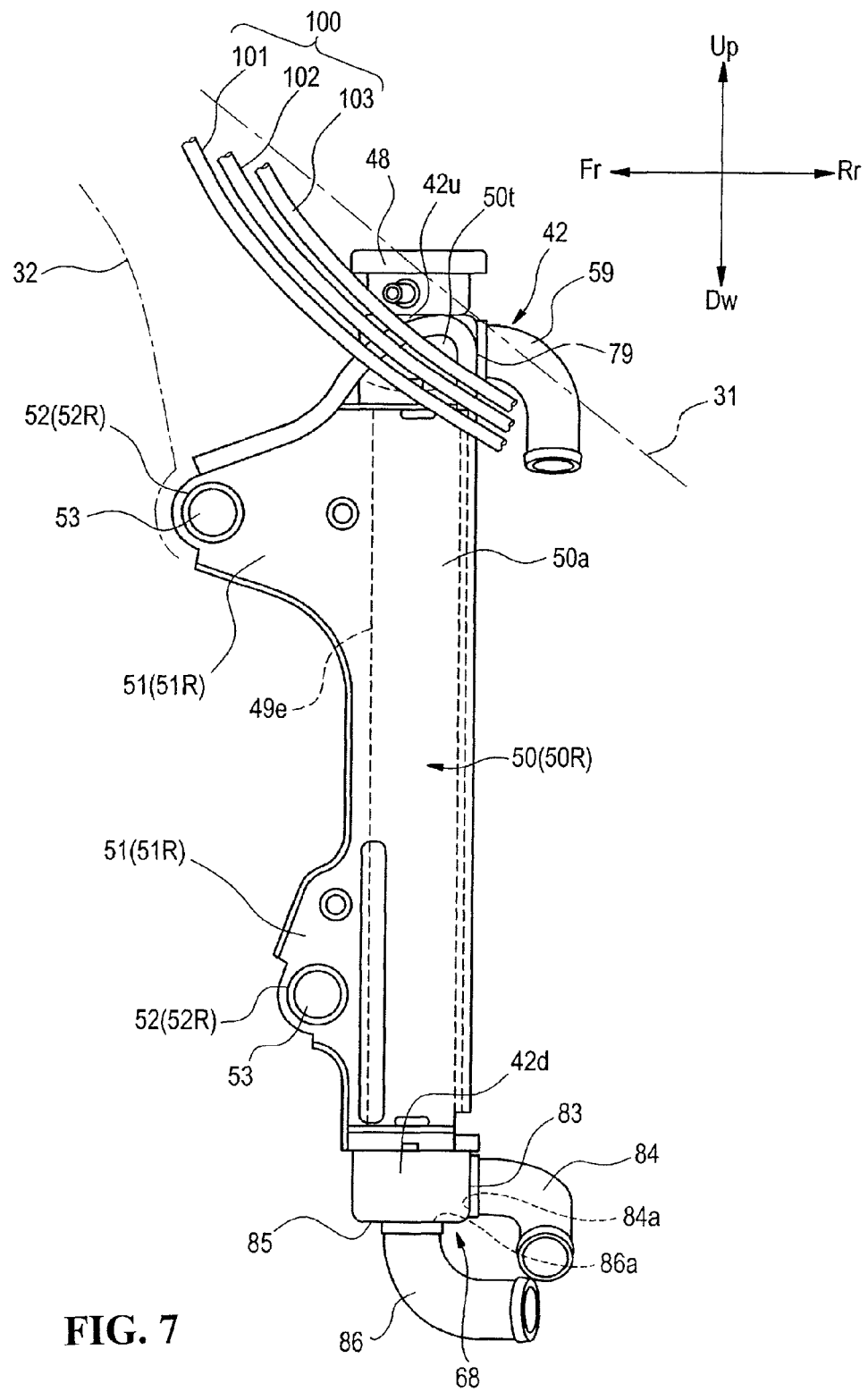
FIG. 7 is a side view of a right radiator of the radiator body according to the present invention, viewed from the inner side of the vehicle.
Figure 8:
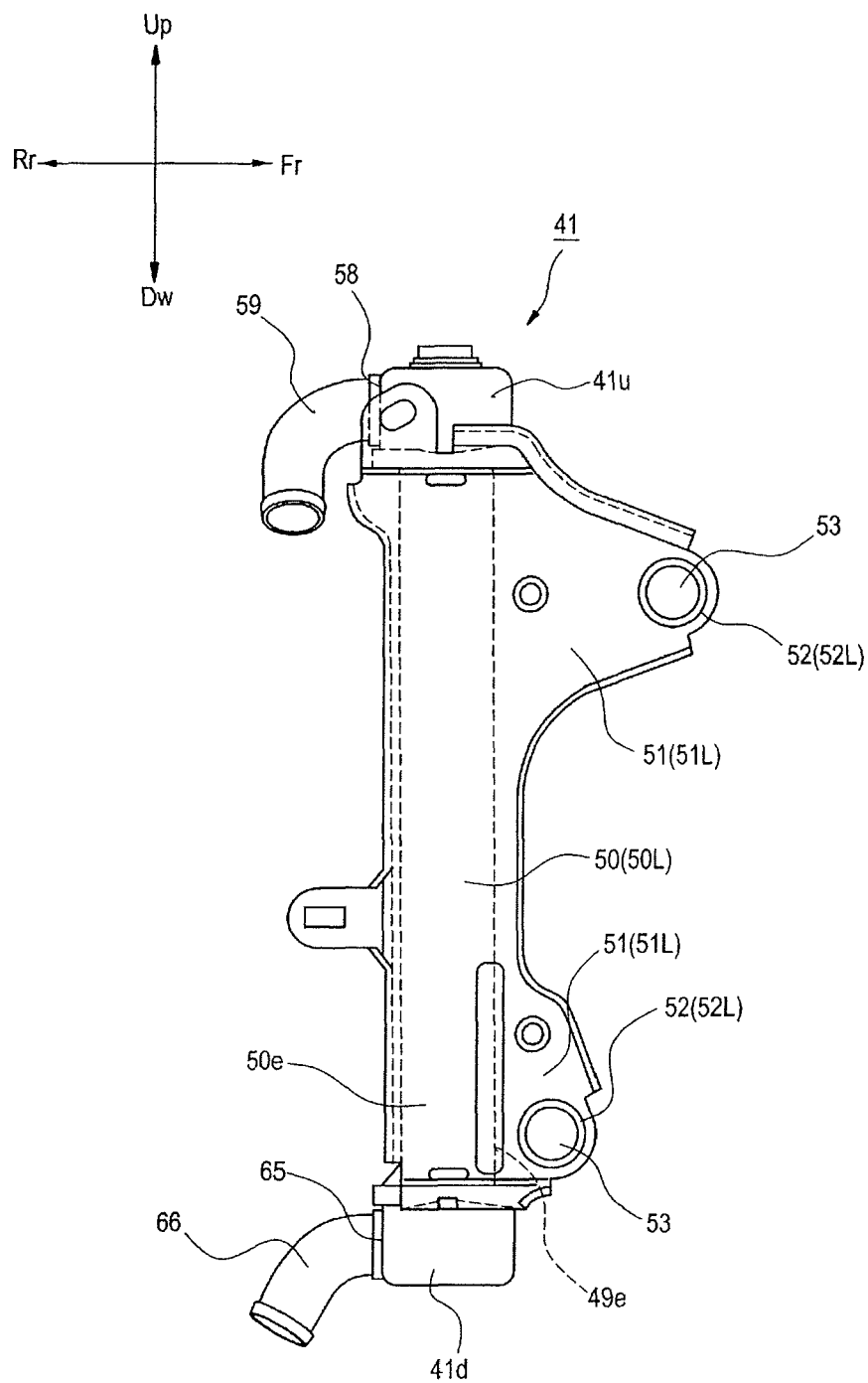
FIG. 8 is a side view of a left radiator of the radiator body according to the present invention, viewed from the inner side of the vehicle.

The brackets 50 (SOL, 50R) of this embodiment are disposed, for example, as shown in FIGS. 7 and 8, inside of the left and right cores 49 in the vehicle width direction. Each of the brackets 50 (50L, 50R) is provided with an extension portion 51 (51L, 51R) extending in the vehicle front-rear direction (forward of the vehicle in this embodiment). The extension portion 51 (51L, 51R) is formed so that its vertical width decreases gradually toward an extended leading end thereof (forward of the vehicle) in a side view. Further, a fixing portion 52 (52L, 52R) with a mounting hole 53 is provided on the extended leading end.

The fixing portion 52 (52L, 52R) is fixed to the down tube 32 of the body frame 11. Furthermore, the extension portion 51 (51L, 51R) is provided at a plurality of portions in the vertical direction of the bracket 50 (50L, 50R). The extension portions 51 (51L, 51R) are constructed such that the extension portion 51 (51L, 51R) located on the upper side has a greater extension length.

The opposed sidewalls 50e of the brackets 50 (SOL, 50R) are directly fixed by brazing to the fins 41f of the respective cores 49. In this manner, the fins 41f of the cores 49 and the brackets 50 are directly fixed to each other.

In this embodiment, as shown in FIG. 7, the bracket 50R of the right radiator 42 is formed, at an upper end thereof, with a protruding angular portion 50t of triangular shape in a side view. The uppermost end of the protruding angular portion 50t extends to an elevation of the upper end of the upper tank 42u. Also, cables 100, such as a throttle return cable 101, a throttle cable 102, and a clutch cable 103, passing rightward of the main frame 31, are arranged so as to pass between the bracket 50R and the down tube 32 in the vehicle width direction (see FIG. 3).

As described above, the upper end of the bracket 50R extends to form the protruding angular portion 50t, thereby allowing the positioning of the cables 100 in the space formed by the bracket 50R and the down tube 32. Thus, the bracket 50R also functions as a guard member that prevents the cables 100 from being displaced outwardly in the vehicle width direction.

The fixing structure of the radiator body 40 of this embodiment will be described.

On the vehicle widthwise inner side of the left and right radiators 41 and 42 of the radiator body 40, the fixing portions 52 (52L, 52R) of the extension portions 51 (51L, 51R) are fastened to the above-described four mounting portions 32a and 32b of the down tube 32.

For this fixation of the extension portions 51 (51L, 51R), an elastic member 52a having a through-hole is previously fitted within each of the mounting holes 53, and, as shown in FIG. 6, with the through-hole aligned with a hole of the corresponding mounting portion 32b, a fastening screw 52c is inserted into the through-hole and fastened.

Furthermore, the left and right radiators 41 and 42 are covered, from the vehicle widthwise outside, with shrouds 90 fixed to the vehicle body as appropriate (see FIGS. 6 and 9). Also, the shrouds 90 and the left and right radiators 41 and 42 are fixed to each other by threading fastening screws 92 into outer fixing portions 91 of the left and right radiators 41 and 42.

Figure 10:
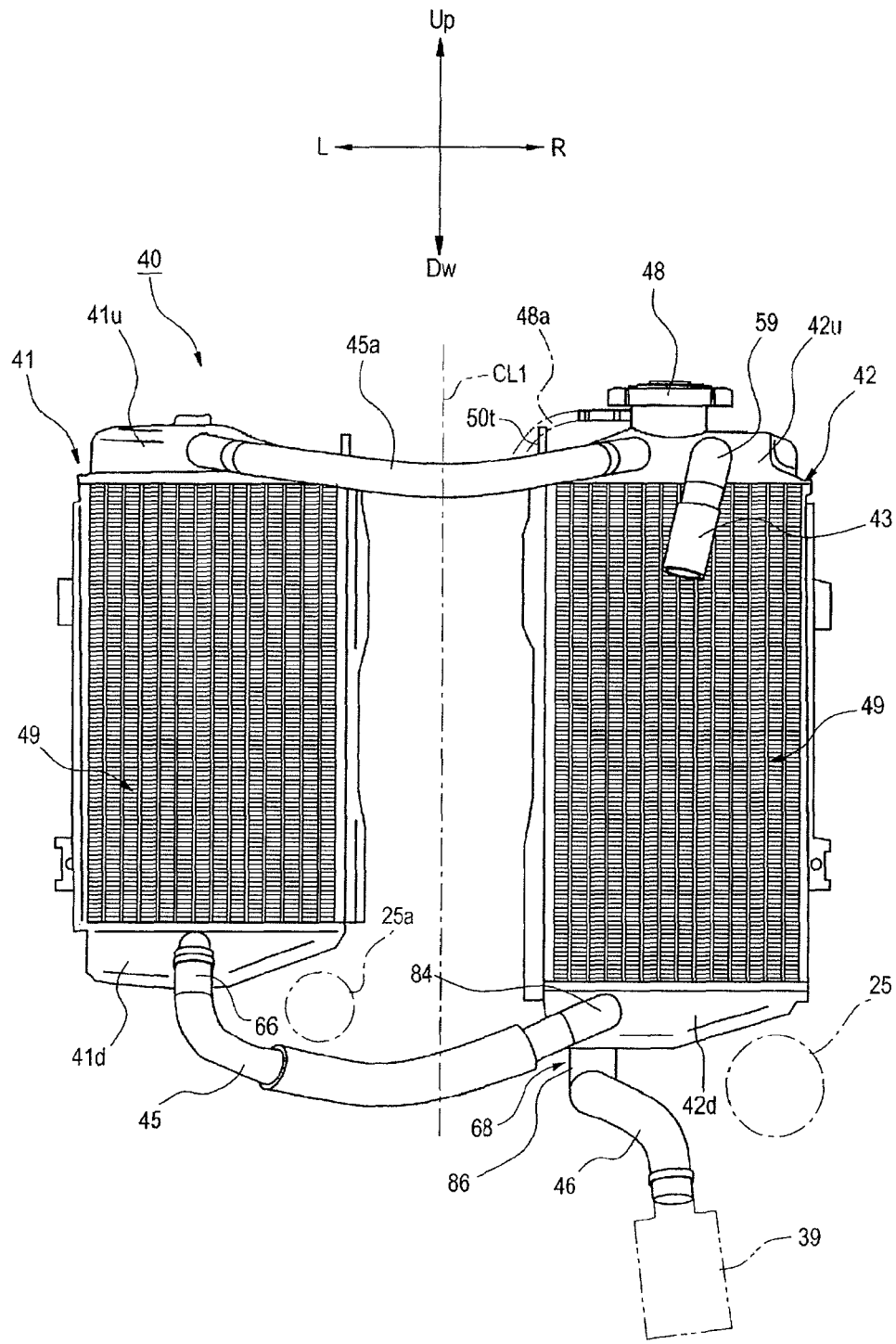
FIG. 10 is a rear view of the radiator body showing the essential parts of a modification of the present invention, viewed from the rear of the vehicle.

Hereinafter, a modification of the foregoing embodiment will be described with reference to FIG. 10.

In the foregoing embodiment, as shown in FIG. 2, the radiator body 40 is constructed in such a manner so as to be split into the left and right radiators 41 and 42 as described above, in which the coolant W flows through the first radiator hose 43, the branch pipe 20, and the second radiator hoses 44 (44L, 44R) into the upper tank 41u of the left radiator 41 and the upper tank 42u of the right radiator 42. However, in the present invention, a coupling structure such as shown in FIG. 10 may be employed.

More specifically, the arrangement is such that the upper tank 41u of the left radiator 41 and the upper tank 42u of the right radiator 42 are connected to each other through an upper communicating radiator hose 45a, in which the coolant W flowing into the upper tank 42u of the right radiator 42 also flows into the upper tank 41u of the left radiator 41. Furthermore, the upper communicating radiator hose 45a has a downwardly-expanding piping form. With this structure, air becomes less likely to accumulate in the upper communicating radiator hose 45a and the flow of coolant becomes smoother.

This structure using the upper communicating radiator hose 45a eliminates the need for the branch pipe 20 and allows a reduction in the number of components. Also, it is possible to ensure a desired flow of the coolant W without using the branch pipe 20 that is a relatively large component and contribute to the miniaturization of the radiator body 40.

The invention being thus described, the present invention is not limited to the foregoing embodiment, and various modifications may be made. For example, in the foregoing embodiment, the lower recesses 82 and 64 are each formed in a tapered shape, but also may have, for example, a curve form to correspond to the outer peripheral surface of the exhaust pipe 25.

Also, while the above-described embodiment is in terms of the motorcycle, the present invention is not limited thereto, but also applicable to various saddle-ride type vehicles including a radiator body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A saddle-ride vehicle having a radiator body including a first radiator and a second radiator, the first and second radiators each comprising:
    a core composed of radiating fins and tubes, alternately laminated, wherein the tubes allow a passage of coolant; and
    an upper tank and a lower tank connected to each end in a longitudinal direction of the tubes to allow for storage of the coolant;
    the radiator body being disposed forward of an engine while sandwiching a down tube between the first and second radiators in a vehicle left-right direction, the down tube extending rearwardly and downwardly of a head pipe;
    the radiator body and an exhaust pipe are disposed in an overlapping manner when the vehicle is viewed in a plan view, the exhaust pipe being connected to the engine,
    wherein the lower tank of the first radiator includes:
        an inlet for the coolant from a lower communicating radiator hose for allowing coolant to flow from the lower tank of the second radiator; and
        an outlet for the coolant to a lower end radiator hose that is connected from the lower tank of the first radiator to the engine; and
    wherein the exhaust pipe includes an exhaust pipe coupling portion connected to the engine, the exhaust pipe coupling portion being provided so as to be deviated to be farther to the first radiator than to the second radiator.

2. The saddle-ride vehicle according to claim 1, wherein the second radiator has a radiator lower end raised above that of the first radiator.

3. The saddle-ride vehicle according to claim 2, wherein the lower communicating radiator hose is provided so as to pass under the exhaust pipe extending forward of the vehicle from the exhaust pipe coupling portion and expand downward.

4. The saddle-ride vehicle according to claim 2, wherein the inlet and the outlet are provided in positions overlapping each other in a vehicle width direction when viewed in a vehicle front-rear direction.

5. The saddle-ride vehicle according to claim 2, wherein the lower tank is provided with a lower recess at a portion of a lower surface thereof, the portion of the lower surface being displaced from a multiple-pipe connection that is formed with the inlet and the outlet with the lower recess avoiding interference with the exhaust pipe; and
    the exhaust pipe is disposed to pass through space formed by the lower recess.

6. The saddle-ride vehicle according to claim 2, wherein the first radiator is constructed to have a larger capacity than the second radiator;
    the coolant from the engine is injected into the upper tank of the first radiator; and
    the saddle-ride vehicle is provided with an upper communicating radiator hose for supplying the coolant from the upper tank of the first radiator to the upper tank of the second radiator.

7. The saddle-ride vehicle according to claim 1, wherein the lower communicating radiator hose is provided so as to pass under the exhaust pipe extending forward of the vehicle from the exhaust pipe coupling portion and expand downward.

8. The saddle-ride vehicle according to claim 7, wherein the inlet and the outlet are provided in positions overlapping each other in a vehicle width direction when viewed in a vehicle front-rear direction.

9. The saddle-ride vehicle according to claim 7, wherein the lower tank is provided with a lower recess at a portion of a lower surface thereof, the portion of the lower surface being displaced from a multiple-pipe connection that is formed with the inlet and the outlet with the lower recess avoiding interference with the exhaust pipe; and
    the exhaust pipe is disposed to pass through space formed by the lower recess.

10. The saddle-ride vehicle according to claim 7, wherein the first radiator is constructed to have a larger capacity than the second radiator;

the coolant from the engine is injected into the upper tank of the first radiator; and the saddle-ride vehicle is provided with an upper communicating radiator hose for supplying the coolant from the upper tank of the first radiator to the upper tank of the second radiator.

11. The saddle-ride vehicle according to claim 1, wherein the inlet and the outlet are provided in positions overlapping each other in a vehicle width direction when viewed in a vehicle front-rear direction.

12. The saddle-ride vehicle according to claim 11, wherein the first radiator is constructed to have a larger capacity than the second radiator;

the coolant from the engine is injected into the upper tank of the first radiator; and the saddle-ride vehicle is provided with an upper communicating radiator hose for supplying the coolant from the upper tank of the first radiator to the upper tank of the second radiator.

13. The saddle-ride vehicle according to claim 1, wherein the lower tank is provided with a lower recess at a portion of a lower surface thereof, the portion of the lower surface being displaced from a multiple-pipe connection that is formed with the inlet and the outlet with the lower recess avoiding interference with the exhaust pipe; and the exhaust pipe is disposed to pass through space formed by the lower recess.

14. The saddle-ride vehicle according to claim 1, wherein the first radiator is constructed to have a larger capacity than the second radiator;

the coolant from the engine is injected into the upper tank of the first radiator; and the saddle-ride vehicle is provided with an upper communicating radiator hose for supplying the coolant from the upper tank of the first radiator to the upper tank of the second radiator.

15. The saddle-ride vehicle according to claim 1, wherein the first radiator has a longer length than the second radiator and extends lower than a bottom of the second radiator, and a multiple-pipe connection is provided on the first radiator with the inlet for the coolant from the lower communicating radiator hose and the outlet for the coolant to the lower end radiator hose.

16. A first radiator and a second radiator for use with a saddle-ride vehicle, the first and second radiators each comprising:

a core composed of radiating fins and tubes, alternately laminated, wherein the tubes allow a passage of coolant; and an upper tank and a lower tank connected to each end in a longitudinal direction of the tubes to allow for storage of the coolant;

the radiator body and an exhaust pipe are disposed in an overlapping manner when the vehicle is viewed in a plan view, the exhaust pipe being connected to the engine, wherein the lower tank of the first radiator includes:

an inlet for the coolant from a lower communicating radiator hose for allowing coolant to flow from the lower tank of the second radiator; and an outlet for the coolant to a lower end radiator hose that is connected from the lower tank of the first radiator to the engine; and wherein the exhaust pipe includes an exhaust pipe coupling portion connected to the engine, the exhaust pipe coupling portion being provided so as to be deviated to be farther to the first radiator than to the second radiator.

17. The radiator body for use with a saddle-ride vehicle according to claim 16, wherein the second radiator has a radiator lower end raised above that of the first radiator.

18. The radiator body for use with a saddle-ride vehicle according to claim 16, wherein the lower communicating radiator hose is provided so as to pass under the exhaust pipe extending forward of the vehicle from the exhaust pipe coupling portion and expand downward.

19. The radiator body for use with a saddle-ride vehicle according to claim 16, wherein the inlet and the outlet are provided in positions overlapping each other in a vehicle width direction when viewed in a vehicle front-rear direction.

20. The radiator body for use with a saddle-ride vehicle according to claim 16, wherein the lower tank is provided with a lower recess at a portion of a lower surface thereof, the portion of the lower surface being displaced from a multiple-pipe connection that is formed with the inlet and the outlet with the lower recess avoiding interference with the exhaust pipe; and the exhaust pipe is disposed to pass through space formed by the lower recess.

21. The radiator body for use with a saddle-ride vehicle according to claim 16, wherein the first radiator is constructed to have a larger capacity than the second radiator;

the coolant from the engine is injected into the upper tank of the first radiator; and the saddle-ride vehicle is provided with an upper communicating radiator hose for supplying the coolant from the upper tank of the first radiator to the upper tank of the second radiator.

22. The radiator body for use with a saddle-ride vehicle according to claim 16, wherein the first radiator has a longer length than the second radiator and extends lower than a bottom of the second radiator, and a multiple-pipe connection is provided on the first radiator with the inlet for the coolant from the lower communicating radiator hose and the outlet for the coolant to the lower end radiator hose.

* * * * *